United States Patent
Hauptmann et al.

(10) Patent No.: US 12,465,560 B2
(45) Date of Patent: Nov. 11, 2025

(54) PROCESS FOR PRODUCING A DENTAL ZIRCONIA ARTICLE WITH A FAST SINTERING PROCESS

(71) Applicant: Solventum Intellectual Properties Company, Maplewood, MN (US)

(72) Inventors: Holger Hauptmann, Sindelsdorf (DE); Martin Goetzinger, Pflugdorf (DE); Sybille A. Schmittner, Inning (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 1064 days.

(21) Appl. No.: 16/975,193

(22) PCT Filed: Feb. 25, 2019

(86) PCT No.: PCT/IB2019/051511
§ 371 (c)(1),
(2) Date: Aug. 24, 2020

(87) PCT Pub. No.: WO2019/166938
PCT Pub. Date: Sep. 6, 2019

(65) Prior Publication Data
US 2021/0093517 A1    Apr. 1, 2021

(30) Foreign Application Priority Data
Feb. 28, 2018 (EP) ................................... 18159101

(51) Int. Cl.
*A61K 6/818* (2020.01)
*A61C 13/00* (2006.01)
(Continued)

(52) U.S. Cl.
CPC .......... *A61K 6/818* (2020.01); *A61C 13/0022* (2013.01); *A61C 13/083* (2013.01);
(Continued)

(58) Field of Classification Search
CPC .. A61K 6/818; A61C 13/0022; A61C 13/083; A61C 13/0003; B28B 11/243;
(Continued)

(56) References Cited

U.S. PATENT DOCUMENTS 7,985,119 B2    7/2011  Basler
8,141,217 B2    3/2012  Gubler
(Continued)

FOREIGN PATENT DOCUMENTS

CN    107162603        9/2017
CN    107162603 A  *  9/2017
(Continued)

OTHER PUBLICATIONS

1507 Extended EP Searc Report for E18159101.7, May 25, 2018, 8 pages.
(Continued)

*Primary Examiner* — Susan D Leong
*Assistant Examiner* — Vipul Malik

(57) ABSTRACT

The invention relates to a process of sintering a dental zirconia restoration, the process comprising a first step of heat-treating a porous dental zirconia article with a heating rate of at least 3 K/sec until a temperature level of 75 to 90% of the final sintering temperature is achieved to obtain a partially sintered dental zirconia article, the porous dental zirconia article having a BET surface of 5 to 12 m²/g and being composed of a 4 mol % yttria stabilized zirconia material and having an alumina content of utmost 0.15 wt. %.

13 Claims, 1 Drawing Sheet

(51) Int. Cl.
*A61C 13/083* (2006.01)
*B28B 11/24* (2006.01)
*C04B 35/64* (2006.01)

(52) U.S. Cl.
CPC ............ *B28B 11/243* (2013.01); *C04B 35/64* (2013.01); *C04B 2235/6562* (2013.01); *C04B 2235/6567* (2013.01); *C04B 2235/661* (2013.01); *C04B 2235/668* (2013.01)

(58) Field of Classification Search
CPC ............ C04B 35/64; C04B 2235/6562; C04B 2235/6567; C04B 2235/661; C04B 2235/668; C04B 2235/3225; C04B 35/486
See application file for complete search history.

(56) References Cited

U.S. PATENT DOCUMENTS

| | | |
|---|---|---|
| 2015/0219397 A1 | 8/2015 | Rohner |
| 2015/0238291 A1* | 8/2015 | Hauptmann ............ A61C 13/08 264/16 |
| 2016/0310245 A1* | 10/2016 | Fujisaki ................. C01G 25/02 |
| 2017/0360536 A1 | 12/2017 | Alqarawi |
| 2019/0101332 A1 | 4/2019 | Schmidt |

FOREIGN PATENT DOCUMENTS

| | | | | |
|---|---|---|---|---|
| DE | 20316004 | | 3/2004 | |
| DE | 102013226497 | | 6/2015 | |
| EP | 2263988 | | 12/2010 | |
| EP | 3088373 | | 11/2016 | |
| WO | WO 2001-013862 | | 3/2001 | |
| WO | WO 2002-045614 | | 6/2002 | |
| WO | WO 2014/022643 | | 2/2014 | |
| WO | WO-2016019114 A1 * | 2/2016 | ......... A61C 13/0022 |
| WO | WO 2018-029244 | | 2/2018 | |
| WO | WO-2018029244 A1 * | 2/2018 | ......... A61C 13/0022 |

OTHER PUBLICATIONS

International Search report for PCT International Application No. PCT/IB2019/051511 mailed on May 15, 2019, 5 pages.
Butt, et al., "Physics and Chemistry of Interfaces", 2003, p. 198.
Hoboroaba, et al., Characterization of Nanoparticles, 2020, p. 268.
Zhang, et al., "Novel Zirconia Materials in Dentistry", Journal of Dental Research, 2018, vol. 97(2), pp. 140-147.

* cited by examiner

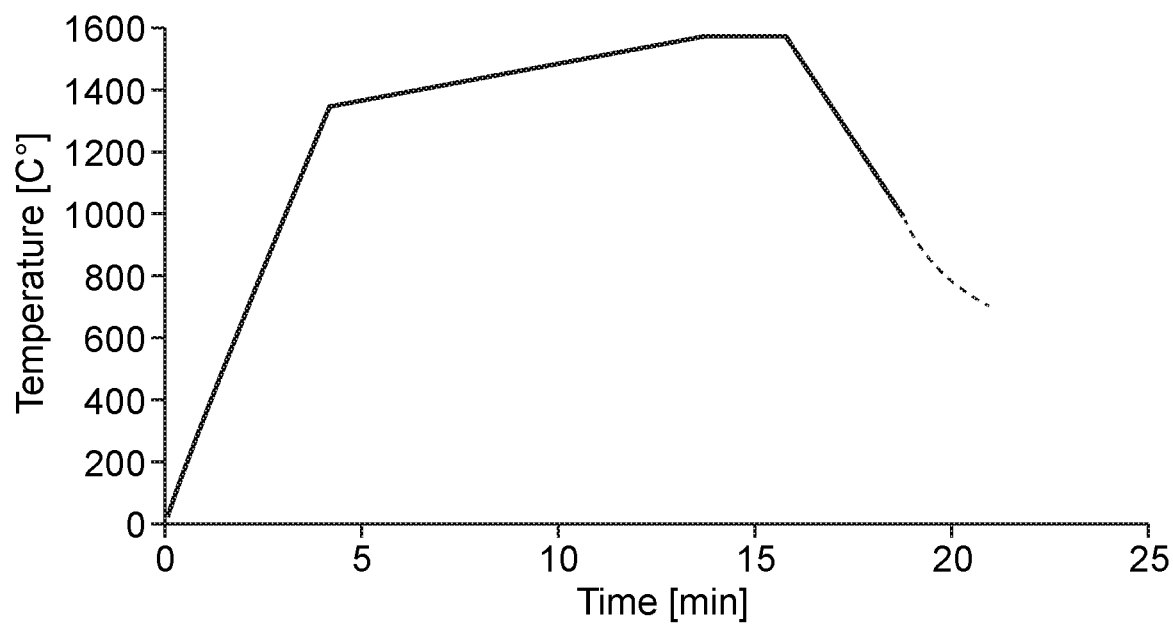

PROCESS FOR PRODUCING A DENTAL ZIRCONIA ARTICLE WITH A FAST SINTERING PROCESS

CROSS REFERENCE TO RELATED APPLICATIONS

This application is a national stage filing under 35 U.S.C. 371 of PCT/IB2019/051511, filed 25 Feb. 2019, which claims the benefit of European Patent Application No. 18159101.7, filed 28 Feb. 2018, the disclosures of which are incorporated by reference in their entirety herein.

FIELD OF THE INVENTION

The invention relates to a process of producing a dental zirconia restoration from a porous zirconia article by applying a heat-treatment step with a high heating rate.

BACKGROUND

One approach for producing dental restorations is to machine the dental restoration to be inserted in the mouth of a patient from a pre-sintered zirconia material.

In this respect, the zirconia dental restoration is typically made in a dental laboratory by machining a pre-sintered, porous block to a desired shape, thereby considering the shrinkage of the zirconia material during a later firing process.

After the firing step, a second so-called glaze-firing or polishing step is typically needed, particularly, if a glossy and highly esthetic dental restoration is desired.

For firing or sintering these materials various furnaces are meanwhile available (e.g. Lava™ Furnace 200; 3M Oral Care).

Recently, a furnace was introduced in the market which allows a higher heating-rate compared to existing furnaces (CEREC™ SpeedFire; Dentsply Sirona).

Technical details of such a furnace are described in WO 2017/144644 A1 (Sirona). It is described that the furnace can be used for sintering various materials e.g. dental restorations machined from non-noble metal materials, lithium disilicate, and from porous zirconia and alumina materials. It is outlined, that depending on the color of the materials, different heating rates should be used.

Thus, obviously the outcome of the sintering process is influenced by the material which is sintered, e.g. whether it is colored or not.

In WO 2018/029244 A1 (Sirona) a blank for producing a tooth replacement part using a CAD/CAM device is described, wherein the blank comprises a block of a sintered material, said block of sintered material having already been pre-sintered in a furnace at an initial sintering temperature between 1000° C. and 1250° C.

CN 107 162 603 A (Aidit Digital Dental Systems) describes a rapid sintering method for zirconia ceramic containing either 3 mol % or 5 mol % yttria. The rapid sintering method is characterized by a heating rate of 120° C./min.

SUMMARY

There is a general desire for a process enabling the practitioner to produce zirconia dental restorations chairside, i.e. in a process, which does not require the use of a dental lab.

Particularly, there is a desire for a fast procedure. If possible, the time needed from scanning the dental situation in the mouth of a patient to the fixation of the dental restoration in the mouth of a patient should be below 50 min.

Further, if possible, the process should be easy to handle and reveal predictable results.

Ideally, the final zirconia dental restoration should be sufficient translucent and have adequate strength.

However, a too fast sintering of a porous zirconia article may negatively influence the esthetic properties of the sintered zirconia article, in particular translucency.

Thus, there is a need for a material and process enabling the practitioner to produce esthetic dental restorations within a short period of time, in particular dental restorations having a sufficient translucency and/or sufficient strength.

One or more of the above objects are addressed by the invention described in the present text and claims.

In one embodiment, the invention features a process of producing a dental zirconia restoration, the process comprising a first step of heat-treating a porous dental zirconia article
- with a heating rate of at least 3 K/sec
- until a temperature level of 75 to 90% or 80 to 88% of the final sintering temperature expressed in ° C. is achieved to obtain a partially sintered dental zirconia article, wherein the final sintering temperature is typically within a range of 1,500 to 1,650° C. or within a range of 1,500 to 1,600° C.,
- the porous dental zirconia article
  - having a BET surface area of 5 to 12 m$^2$/g and
  - being composed of a zirconia material containing about 4 mol % yttria and having an alumina content of utmost 0.15 wt. %.

A further aspect of the invention is directed to the use of the porous dental zirconia article described in the claims and the present text for producing a dental zirconia restoration, the process of producing comprising the step of heat-treating the porous dental zirconia article with a heating rate of at least 3 K/sec.

Unless defined differently, for this description the following terms shall have the given meaning:

The term "dental article" means any article which is to be used in the dental field, especially for producing a dental restoration, a tooth model and parts thereof.

The dental article has a 3-dimensional inner and outer surface including convex and concave structures. Compared to other articles such as pottery or paving stones, a dental article is small and filigree. The thickness of the dental article can vary from very thin, e.g. at the edges and rims (below 0.1 mm) to considerably thick, e.g. in the biting area (up to 8 or 16 mm). Sections bridging the crown portions in dental bridges might have a thickness up to 20 mm.

The outer surface typically has an overall convex shape, whereas the inner surface typically has an overall concave shape.

The dental article described in the present text comprises or essentially consists after sintering of a polycrystalline ceramic material comprising yttrium stabilized $ZrO_2$.

Examples of dental articles include crowns (including monolithic crowns), bridges, inlays, onlays, veneers, facings, copings, crown and bridged framework, implants, abutments, orthodontic appliances (e.g. brackets, buccal tubes, cleats and buttons), monolithic dental restorations (i.e. restorations which do not need to be veneered) and parts thereof. The surface of a tooth is not regarded a dental article.

A dental article should not contain components which are detrimental to the patient's health and thus free of hazardous and toxic components being able to migrate out of the dental article.

By "dental mill blank" is meant a solid block (3-dim article) of material from which a dental article, dental workpiece, dental support structure or dental restoration can and typically is to be machined in any subtractive process, e.g. aside from milling also by grinding, drilling etc. A dental mill blank has a geometrically defined shape and comprises at least one flat surface. A so-called "free form surface" is not regarded as "geometrically defined". In this respect, the shape of a dental restoration (e.g. crown or bridge) itself is not regarded a dental mill blank.

"Zirconia article" shall mean a 3-dimensional article wherein at least one of the x,y,z dimensions is at least 5 mm, the article being composed of at least 80 or at least 90 or at least 95 wt. % zirconia.

"Ceramic" means an inorganic non-metallic material that is produced by application of heat. Ceramics are usually hard, porous and brittle and, in contrast to glasses or glass ceramics, display an essentially purely crystalline structure.

"Crystalline" means a solid composed of atoms arranged in a pattern periodic in three dimensions (i.e., has long range crystal structure as determined by X-ray diffraction). Crystal structures include tetragonal, monoclinic, cubic zirconia and mixtures thereof.

"Monolithic dental restoration" means a dental ceramic article onto the surface of which no facing or veneer has been attached. That is, the monolithic dental restoration is essentially composed of only one material composition. However, if desired, a thin glazing layer can be applied.

"Glass" means an inorganic non-metallic amorphous material which is thermodynamically an under-cooled liquid. Glass refers to a hard, brittle, transparent solid. Typical examples include soda-lime glass and borosilicate glass. A glass is an inorganic product of fusion which has been cooled to a rigid condition without crystallizing. Most glasses contain silica as their main component and a certain amount of glass former and modifier "Glass-ceramic" means an inorganic non-metallic material where one or more crystalline phases are surrounded by a glassy phase so that the material comprises a glass material and a ceramic material in a combination or mixture. It is formed as a glass, and then crystallized by a nucleation and crystallization heat treatment. Glass ceramics may refer to a mixture of lithium-, silicon-, and aluminium-oxides. The porous dental material described in the present text does not contain a glass-ceramic.

A "powder" means a dry, bulk composed of a large number of fine particles that may flow freely when shaken or tilted.

A "particle" means a substance being a solid having a shape which can be geometrically determined. The shape can be regular or irregular. Particles can typically be analysed with respect to e.g. grain size and grain size distribution.

"Density" means the ratio of mass to volume of an object. The unit of density is typically $g/cm^3$. The density of an object can be calculated e.g. by determining its volume (e.g. by calculation or applying the Archimedes principle or method) and measuring its mass.

The volume of a sample can be determined based on the overall outer dimensions of the sample. The density of the sample can be calculated from the measured sample volume and the sample mass. The total volume of the material can be calculated from the mass of the sample and the density of the used material. The total volume of cells in the sample is assumed to be the remainder of the sample volume (100% minus the total volume of material).

A "porous material" refers to a material comprising a partial volume that is formed by voids, pores, or cells in the technical field of ceramics.

The term "calcining" refers to a process of heating a solid material to drive off at least 90 percent by weight of volatile chemically bound components (e.g., organic components) (vs., for example, drying, in which physically bound water is driven off by heating). Calcining is done at a temperature below a temperature needed to conduct a pre-sintering step.

The terms "sintering" or "firing" are used interchangeably. A porous ceramic article shrinks during a sintering step, that is, if an adequate temperature is applied. The sintering temperature to be applied depends on the ceramic material chosen. For $ZrO_2$ based ceramics a typical sintering temperature range is 1,100° C. to 1,550° C. If the sintering is done with high heating-rates, higher temperatures may be required. Sintering typically includes the densification of a porous material to a less porous material (or a material having less cells) having a higher density, in some cases sintering may also include changes of the material phase composition (for example, a partial conversion of an amorphous phase toward a crystalline phase).

A dental zirconia article is classified as "pre-sintered", if the dental zirconia article has been treated with heat (temperature range of 900 to 1,100° C.) for 1 to 3 h to such an extent that the raw breaking resistance of the dental ceramic measured according to the "punch on three ball test" ISO 6872:2015 is within a range of 15 to 55 MPa or 20 to 50 MPa.

A pre-sintered dental ceramic usually has a porous structure and its density (usually 3.0 $g/cm^3$ for an yttrium stabilized zirconia ceramic) is less compared to a completely sintered dental ceramic framework (usually 6.1 $g/cm^3$ for an yttrium stabilized zirconia ceramic).

"Isotropic sintering behaviour" means that the sintering of a porous body during the sintering process occurs essentially invariant with respect to the directions x, y and z. "Essentially invariant" means that the difference in sintering behaviour with respect to the directions x, y and z is in a range of not more than +/−5% or +/−2% or +/−1%.

"Colouring ions" shall mean ions which have an absorption in the spectral range visible to the human eye (e.g. 380 to 780 nm), which results in a coloured solution (visible to the human eye), if the colouring ions are dissolved in water (e.g. about 0.6 mol/l) and/or cause a colouring effect in the zirconia article which has been treated with a colouring solution and sintered afterwards. Colouring ions may also be present in the powder before the powder used for producing the zirconia article is compacted.

A "fluorescing agent" shall mean an agent showing fluorescence in the region of visible light (380 to 780 nm).

By "machining" is meant milling, grinding, cutting, carving, or shaping a material by machine. Milling is usually faster and more cost effective than grinding. A "machinable article" is an article having a 3-dimensional shape and having sufficient strength to be machined.

"Ambient conditions" mean the conditions which the inventive solution is usually subjected to during storage and handling. Ambient conditions may, for example, be a pressure of 900 to 1,100 mbar, a temperature of 10 to 40° C. and a relative humidity of 10 to 100%. In the laboratory ambient conditions are adjusted to 20 to 25° C. and 1,000 to 1,025 mbar.

A composition is "essentially or substantially free of" a certain component, if the composition does not contain said component as an essential feature. Thus, said component is not willfully added to the composition either as such or in combination with other components or ingredient of other components. A composition being essentially free of a certain component usually does not contain that component at all. However, sometimes the presence of a small amount of the said component is not avoidable e.g. due to impurities contained in the raw materials used.

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

The terms "comprise" or "contain" and variations thereof do not have a limiting meaning where these terms appear in the description and claims. The term "comprise" shall include also the terms "consist essentially of" and "consists of".

Adding an "(s)" to a term means that the term should include the singular and plural form. E.g. the term "additive (s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

"And/or" means one or both. E.g., the expression component A and/or component B refers to a component A alone, component B alone, or to both component A and component B.

BRIEF DESCRIPTION OF FIGURES

FIG. 1 shows an example of a sinter protocol useful for sintering a zirconia material containing about 4 mol % yttria.

DETAILED DESCRIPTION

The general idea of the invention is based on the finding, that the speed of sintering a zirconia material can be improved by using a zirconia material containing about 4 mol % yttria and having a BET surface of 5 to 12 m²/g or 5.5 to 11 m²/g in combination with a low alumina content of utmost 0.15 wt. % or utmost 0.13 wt. % or utmost 0.1 wt. %.

The invention described in the present text provides the following advantages:

The process saves time for the practitioner.

The sintering process for a dental zirconia article (including the heat-treatment steps and the cooling-down step) can be shortened to less than 30 or less than 25 min.

The obtained sintered zirconia article meets the requirements of an esthetic dental zirconia restoration, in particular as regards translucency of the zirconia material.

It was also found, that a sufficient translucency of the zirconia material can be obtained, even, if the heat-treating is done with a high heating-rate.

Further, the obtained zirconia article does not show undesired distortion.

In addition, the obtained sintered dental zirconia article has adequate strength and does not show cracks.

The invention relates to a process of producing a dental zirconia restoration by heat-treating a porous dental zirconia article.

The process of producing the dental article comprises the step of firing a porous dental zirconia article until the porous dental article is sintered. The porous dental zirconia is in dry state.

During the firing process, the porous dental article is sintered to its final shape, thereby undergoing changes with regard to dimension, density, hardness, bending strength and/or grain size.

The firing or sintering step are accomplished under conditions which results in a dental ceramic article having an acceptable tooth like colour (e.g. a colour which fits into the Vita™ shade guide). The firing process comprises one or more heat-treating segments.

A first segment of heat-treating is done with a heating rate of at least 3 K/sec or at least 4 K/sec or at least 5 K/sec.

The heating rate should not exceed a rate of 15 K/sec or 12 K/sec or 10 K/sec as this may negatively affect the translucency of the final product. Typical heating rates are thus within a range of 3 to 15 K/sec or 4 to 10 K/sec. With such heating rates a temperature increase of at least 180 to 240° C./min can be obtained.

Thus, the temperature where the sintering of the dental porous zirconia article starts can be reached within a time frame of 4 to 8 min.

In contrast to this, sintering processes described in the prior art typically require at least 45 min for reaching this temperature.

The first heat-treating segment is conducted until a temperature level of 75 to 90% or 80 to 88% of the final sintering temperature expressed in ° C. for the dental zirconia article is reached.

The respective temperature of the first heat-treating segment is typically in the range of 1,200 to 1,400° C. or 1,250 to 1,350° C.

At this temperature, the sintering has partially started, but the dental zirconia article still contains pores, in particular open pores.

If the first heat-treatment segment is performed to a temperature level above the above-mentioned ranges of the final sintering temperature, the resulting dental zirconia article often does not show sufficient translucency.

The first heat-treating segment is typically followed by a second heat-treating segment back-to-back (i.e. without interruption).

The second heat-treating segment is typically conducted at a heating rate which is different from the heating rate of the first heat-treating segment.

According to one embodiment, the heating rate of the second heat-treating segment is lower than the heating rate of the first heat-treating segment.

Heating rates which can be used are typically 2K/sec (or less) or 1K/sec (or less).

The second heat-treating segment is typically done until the sintering temperature of the dental zirconia article is reached.

The sintering temperature for dental zirconia materials described in the present text is typically at least 1,500° C. or at least 1,520° C. or at least 1,550° C. The sintering temperature is typically not more than 1,650° C. or not more than 1,600° C.

The duration of the second heat-treating segment is typically dependent from the size and dimensions of the porous dental zirconia article to be sintered.

The duration of the second heat-treating segment is typically in the range of 1 to 15 min or 2 to 14 min or 5 to 12 min.

Larger dental articles, in particular dental articles having a wall thickness above 8 mm typically require more time than smaller articles.

The second heat-treating segment is typically followed by a third heat-treating segment back-to-back.

During the third heat-treating segment the temperature is typically not further increased but maintained for a so-called dwell time. A suitable dwell time is typically 8 min to 1 min or 5 min to 1 min or 3 min to 1 min.

During the third heat-treatment segment, the final sintering takes place and the remaining pores of the dental zirconia article close.

As indicated above, the duration of the second heat-treating segment is typically dependent from the size and dimensions of the dental zirconia article to be sintered.

The final sintering temperature is typically the temperature reached or held before the cooling step starts.

The final sintering temperature typically corresponds to the temperature reached after the second heat-treatment segment.

For zirconia articles, the final sintering temperature is typically within a range of 1,500 to 1,650° C.

A finally sintered zirconia material typically has a density of at least 98.5% or 99% of the theoretical density.

The third heat-treating segment is typically followed by a cooling-down segment back-to-back. The cooling-down rate is typically at least 3K/sec or at least 4K/sec.

During the cooling-down segment, the sintered dental zirconia article is cooled down to about 1,000° C. When this temperature is reached, the furnace is opened automatically to cool the sintered dental zirconia to room temperature (about 23° C.).

An example of a suitable sintering protocol is shown in FIG. 1.

In this example, the sintering protocol contains the following segments:
  a) a first heat-treating segment up to a temperature of about 1,350° C., which is reached within about 4 min,
  b) a second heat-treating segment up to a temperature of about 1,580° C., which is reached within about 9.5 min,
  c) a third heat-treating segment (dwell time) for about 2 min and
  d) a cool-down segment to a temperature of about 1,000° C., which is reached within about 3 min.

The heat-treating segments and cool-down segment described above can be compiled to a so-called sintering protocol.

FIG. 1 shows an idealized example of a suitable sintering protocol. As known to the skilled person, due to delays in the control engineering, there might be small temperature deviations (e.g. +/−3%) in particular at the interface between the respective segments.

The heat-treating segments are typically conducted at ambient pressure and in air or sometimes in inert gas (e.g. nitrogen, argon).

Generally, the sintering conditions are adjusted such that the sintered dental ceramic article has a density of equal or greater than 98% or 99% of the theoretically achievable density.

According to one embodiment, the process for producing a sintered dental zirconia article is characterized by the following features alone or in combination:
  First segment of heat-treating: heating rate of 3 to 7 K/sec; duration: 8 min or less;
  Second segment of heat-treating: heating rate of 0.2 to 1.0 K/sec, or 0.3 to 0.6 K/sec; duration: 25 min or less;
  Third segment of heat-treating: heating rate of about 0 K/sec; duration: 8 min or less; or 5 min or less; or 3 min or less;
  Cooling-down segment: cooling rate 3 K/sec or more; duration: 6 min or less.

The overall time needed for heat-treating (comprising the first, second and third heat-treating segments) and cooling-down the dental zirconia article is typically 30 min or less, preferably 25 min or less.

The overall time typically also depends to some extent on the volume of the zirconia article to be sintered. Large articles typically require a longer heat-treating time than smaller articles.

Characterizing the volume of the article to be sintered by fitting the article into an artificial sphere can help to select the appropriate sintering protocol. Such an approach is described in WO 2018/029244 A1 (Sirona).

An oven which can be used for the process described in the present text is commercially available from Dentsply Sirona (SpeedFire™).

A suitable furnace is also described in WO 2017/144644 A1 (Sirona). This furnace is for carrying out a heat treatment of a dental replacement part and comprises an induction coil, a radiant heater, an insulation layer and a furnace chamber. Further, the furnace has a cooling system to control the internal temperature of the furnace chamber.

The porous dental zirconia article to be sintered can typically be characterized by the following parameters alone or in combination:
  a) density: 2.85 to 3.35 g/cm$^3$;
  b) BET surface: 5 to 12 m$^2$/g or 5.5 to 11 m$^2$/g.

Using a porous dental zirconia article having a BET surface in the above-mentioned range was found to be advantageous, because it ensures an adequate sintering activity of the material before and during the heat-treating process, in particular during the first heat-treating step with a high heating rate.

An adequate sintering activity is typically needed for obtaining a zirconia article showing the desired translucency within a short sintering time.

Without wishing to be bound to a certain theory, it is believed that, if the BET surface is too high, there are too many pores in the porous dental zirconia article to be sintered. This might negatively influence the sintering of the article and make it more difficult to achieve a dental zirconia article having adequate strength and/or translucency.

If on the other hand the BET surface is too low, it is believed that the porous zirconia article does not have an adequate sintering activity. This might negatively influence the sintering behaviour (e.g. sintering shrinkage, outgassing of remaining sintering aids) of the porous dental zirconia article during the first heat-treating step.

Alternatively, or in addition to the BET surface, the density may also be used for characterizing the material of the porous dental zirconia restoration, because the density is often related to the overall pore volume.

When referring to the BET surface, the surface of the porous zirconia article is meant, not of the powder used for producing the article.

Alternatively, or in addition, the material of the porous dental zirconia article can typically be characterized by the following parameters alone or in combination:
  a) biaxial flexural strength: 15 to 55 determined according to ISO 6872:2015 applying the punch on 3 balls test adapted to measurement in porous state (measurement set up: 3.6 mm punch diameter, 0.1 mm/min load speed, 2 mm sample thickness, support ball diameter 6 mm, 14 mm diameter of supporting balls);
b) Vickers hardness: 15 to 150 (HV 0.5) or from 20 to 140 (HV 0.5);
c) coefficient of thermal expansion: $8.5*10^{-6}$ $K^{-1}$ to $11.5*10^{-6}$ $K^{-1}$.

The following combination of features is sometimes preferred: a) and b); a) and c); a), b) and c).

If desired, the respective features can be determined as described in the example section.

If the Vickers hardness of the material is too low, the machinability could negatively affect the quality (edge chipping or breaking of the workpiece) as well as in the ease of manual reworking to individualize the frame of a dental restoration or a monolithic restoration as well.

If the Vickers hardness of the material is too high, the wear of the machining tools may increase and shorten tool life to an unacceptable level or the tool could break and destroy the workpiece.

It was found that, if the biaxial flexural strength of the material is too low, the material tends to crack during the milling process, during the manual finishing by a dental technician or during firing.

On the other hand, if the biaxial flexural strength of the material is too high, the processing of the material by a milling machine is often not possible with reasonable efforts. The milling tool used or the milled material may tend to chip or break. In such a case, the shaping of the material had to be done by grinding, e.g. using a Cerec™ grinding machine (Sirona).

Generally, the material of porous dental zirconia articles typically comprise ceramic components and stabilizing components.

Optionally, colouring components and fluorescing components can be present.

The ceramic components are generally selected from oxides of Zr, Hf, Al and mixtures thereof.

Thus, besides the main component zirconia, the material of porous zirconia dental mill blanks typically comprise small amounts of the oxides of Hf and Al.

There is no need for alumina to be present, however, the presence of a small amount of alumina may be beneficial as it may contribute to a better hydrothermal stability of the zirconia article after sintering.

However, too high an amount of alumina may have a negative impact on the translucency of the zirconia article after sintering.

Thus, according to the invention alumina may be present in an amount of 0 to 0.15 wt. %, or 0 to 0.12 wt. % or 0 to 0.1 wt. %.

Stabilizing component(s) are typically selected from oxides of Y, Mg, Ca, Ce and mixtures thereof (e.g. $Y_2O_3$, MgO, CaO, $CeO_2$).

The material of the porous dental zirconia article of the invention comprises yttria as stabilizing oxide.

Colouring oxides are sometimes present for adjusting the colour of the final dental restoration.

According to the invention, if present, colouring component(s) are typically selected from oxides of Fe, Mn, Cr, Ni, Co, Er, Pr, Nd, in particular from oxides of Mn, Er, Pr, Co and mixtures thereof (e.g. $MnO_2$, $Er_2O_3$, $Pr_2O_3$, CoO).

Colouring component(s) which are typically not present are oxides of Tb. Without wishing to be bound to a certain theory, it is believed that oxides of Tb may have a negative impact on the whole aesthetics.

If present, the fluorescing agent is typically selected from oxides of Bi and mixtures thereof.

Ceramic components are typically present in an amount of 80 to 95 wt. % or 85 to 95 wt. % or 90 to 95 wt. % with respect to the weight of the porous dental article.

Stabilizing components are typically present in an amount of 6 to 8 wt. % with respect to the weight of the porous dental article.

If present, colouring components are typically present in an amount of 0.01 to 1 wt. % or 0.02 to 0.8 wt. % or 0.03 to 0.5 wt. % with respect to the weight of the porous dental article.

If present, the fluorescing agent is typically present in an amount of 0 to 1 wt. % or 0.005 to 0.8 wt. % or 0.01 to 0.1 wt. % with respect to the weight of the porous dental mill blank. The wt. % are calculated based on the amount of the respective oxides.

For obtaining an aesthetic dental article, the following concentrations were found to be useful:
ceramic components: 80 to 95 wt. % or 85 to 95 wt. %,
stabilizing components: 6 to 8 wt. %,
colouring components: 0 to 1 wt. % or 0.01 to 0.8 wt. %,
fluorescing agent: 0 to 1 wt. % or 0.005 to 0.8 wt. %,
wt. % with respect to the weight of the porous dental mill blank.

According to one embodiment, the material of the porous dental zirconia article comprises:
$ZrO_2$: 93 to 96 mol %,
$HfO_2$: 0 to 2 mol %,
$Y_2O_3$: about 4 mol %,
$Al_2O_3$: 0 to 0.1 mol %.

An amount of about 4 mol % yttria typically corresponds to 6.5 to 7.5 wt. % $Y_2O_3$.

In another embodiment, the material of the porous dental zirconia article comprises:
$ZrO_2+HfO_2$: 85 to 93 wt. %;
$Y_2O_3$: 6.5 to 7.5 wt. %;
$Al_2O_3$: 0 to 0.15 wt. %;
colouring oxides: 0.01 to 1 wt. %
% with respect to the weight of the porous dental zirconia article.

The material of the porous dental zirconia article described in the present text contains about 4 mol % yttria. These materials are sometime referred to as 4Y-TZP material.

It has been found that this material is particularly useful for producing an aesthetic zirconia restoration in a heat-treating process as described in the present text.

In contrast to zirconia material containing either 3 mol % yttria (so-called 3Y-TZP materials) or materials containing 5 mol % yttria (so-called 5Y-TZP materials), zirconia materials containing about 4 mol % yttria are sometime advantageous because they provide a good balance of sufficient strength, translucency and sintering behaviour.

In comparison to 4Y-TZP zirconia materials, it was found that the sintering of 3Y-TZP zirconia material often leads to high strength materials, and that the sintering can be achieved within a reasonable time frame, as well. However, the translucency of the sintered zirconia article is typically not sufficient.

The sintering of 5Y-TZP zirconia materials on the other hand typically lead to article having a good translucency, but not adequate strength. Further, the time period needed for sintering is typically too long.

Without wishing to be bound to a particular theory, it is believed that a small amount of alumina being present in the material of the porous dental zirconia article might help be beneficial for improving the sintering behaviour, in particular during the first heat-treating step.

However, the alumina content should not be too high as the resulting material might become too sinter-active. This might result in a too early closing of the pores of the porous dental zirconia article during the first heat-treating step.

It was found that the presence of colouring oxides may also contribute to a faster sintering process. Similar to alumina, these oxides may have a positive impact on the sintering behavior of the porous zirconia material to be sintered.

In particular, the following oxides were found to be useful: oxides selected from Fe, Er, Mn, Co and mixtures thereof.

The material of the porous dental zirconia article does typically not comprise the following components alone or in combination: glass or glass ceramic; oxides of Si, Fe, K, Na in an amount above 1 wt. % with respect to the weight of the material of the porous zirconia dental article. The presence of these elements may negatively affect the overall performance of the mill blank during machining or sintering the machined articles.

The porous dental zirconia article to be sintered is typically produced as follows:

A porous dental mill blank is provided. The porous dental mill blank is machined to obtain a porous zirconia dental article.

The machining step can be done with a milling, drilling, cutting, carving, or grinding device.

Those devices are commercially available e.g. from Roland (DWX mills), or Sirona (CEREC™ inLab CAD/CAM) or others.

If the machining is done by milling, useful milling parameters include:
  rotary speed of milling tool: 5,000 to 40,000 revolutions/min;
  feed rate: 20 to 5,000 mm/min;
  milling cutter diameter: 0.8 to 4 mm.

If desired, the machined porous dental zirconia restoration is cleaned, e.g. removing milling dust with pressurized air.

As the porous dental zirconia mill blank is used for producing the porous dental zirconia article, the material of the porous dental zirconia mill blank is the same as the material of the porous dental zirconia article. The porous dental zirconia mill blank has typically the shape of a block or disc.

If the porous dental zirconia mill blank has the shape of a block, the porous zirconia dental mill blank has typically the following dimensions:
  x-dimension: 12 to 45 mm, or 15 to 40 mm,
  y-dimension: 12 to 70 mm, or 15 to 60 mm,
  z-dimension: 10 to 30 mm, or 15 to 25 mm.

If the porous dental zirconia mill blank has the shape of a disc, the porous dental zirconia mill blank has typically the following dimensions:
  x, y-dimension: 90 to 110 mm, or 95 to 105 mm,
  z-dimension: 5 to 35 mm, or 10 to 30 mm.

Attaching or fixing the dental zirconia mill blank to a machining device, especially to the clamping appliance(s) of such a device, can also be accomplished by providing the blank with suitable means therefore.

Suitable means include frame(s), notch(es), stup(s), mandrel(s) and combinations thereof.

In another embodiment, the dental zirconia mill blank is fixed to or contained in a holding device. The holding device containing the dental mill blank may then function as a means for attaching the blank to a machining device.

Fixing of the dental zirconia mill blank to a holding device can be affected by clamping, gluing, screwing and combinations thereof.

Useful holding devices include frames (open and closed), stubs or mandrels. Using a holding device may facilitate the production of the dental article with a machining device.

Examples of useful holding devices are described in U.S. Pat. No. 8,141,217 B2 (Gubler et al.), WO 02/45614 A1 (ETH Zurich), DE 203 16 004 U1 (Stuehrenberg), U.S. Pat. No. 7,985,119 B2 (Basler et al.) or WO 01/13862 (3M). The content of these documents with respect to the description of the holding device is herewith incorporated by reference.

The porous zirconia mill blank can be produced as follows:

The porous zirconia material of the dental mill blank can be obtained by a process comprising the steps of:
  mixing the powders of the respective oxides contained in the material to obtain a powder mixture and
  pressing the powder mixture.

Mixing of the oxide powders can be achieved by shaking the powders or putting the powders in a mill (e.g. ball mill) and milling the powders until a homogenous powder mixture is obtained. Further possible mixing equipment can include sieves or granulators. To facilitate the pressing step(s), pressing aids can be added, if desired. Suitable pressing aids include binders, lubricating additives and mixtures thereof.

If desired, these aids can be added to the zirconia oxide powder being the main component of the powder mixture.

Suitable metal oxide powders are commercially available from various sources including Tosoh Company (Japan).

The powder mixture is then placed in a mould and pressed into the shape of a dental mill blank.

The applied pressure is typically in a range of 150 to 300 MPa. Alternatively, the applied pressure is set so that the pressed ceramic body reaches a certain density, e.g. in the case of a zirconia ceramic a density from 2.8 g/cm$^3$ to 3.5 g/cm$^3$ or 2.85 g/cm$^3$ to 3.35 g/cm$^3$.

The article obtained after pressing the powder mixture can be machined or sliced into any desired shape. If desired, a calcining step can be done.

In a further step, a heat treatment is applied to the compacted composition to obtain a porous dental mill blank.

The temperature of the heat treatment is typically within a range of 800 to 1,100° C. or 900 to 1,000° C. The heat treatment is typically applied for a duration of 30 to 70 hours or 35 to 60 hours.

The porous zirconia dental mill blank is typically provided to the customer in a form allowing the mounting of the dental mill blank in a milling machine.

Either the top or bottom surface of the porous zirconia dental mill blank typically contains a marking element (e.g. printing or carving) which facilitates the correct orientation of the dental mill blank in a milling machine.

The sintered dental zirconia article or restoration obtained by the process described in the present text can typically be characterized by the following features alone or in combination:
  a) density: at least 98.5 (in some embodiments, about 99, 99.5, 99.9, or even at least about 99.99) percent of theoretical density
  b) biaxial flexural strength: 500 to 1,500 MPa or 800 to 1,400 MPa, determined according to ISO 6872:2015;
  c) Vickers hardness: 450 MPa to 2,200 MPa, or 500 MPa to 1,800 MPa HV(2);
  d) phase content tetragonal phase: 10 to 80 wt. % or 20 to 70 wt. % or 40 to 70 wt. %;

e) phase content cubic phase: 10 to 80 wt. % or 20 to 70 wt. % or 30 to 60 wt. %;
f) translucency: 25% or more, determined on a sample having a thickness of 1 mm in reflection mode at a wave length of 450 to 800 nm;
g) being tooth coloured.

A combination of the following features is sometimes preferred: a) and b); a) and c); a), d) and e); or a), b), d), e) and f).

The sintered dental zirconia article or restoration obtained by the process described in the present text can also be characterized by the following features alone or in combination:
a) density: at least 98.5 percent of theoretical density
b) biaxial flexural strength: 800 to 1,400 MPa, determined according to ISO 6872:2015;
c) Vickers hardness: 500 MPa to 1,800 MPa HV(2);
d) phase content tetragonal phase: 40 to 70 wt. %;
e) phase content cubic phase: 30 to 60 wt. %;
h) translucency: 25% or more, determined on a sample having a thickness of 1 mm in reflection mode at a wave length of 450 to 800 nm.

If desired, the respective features can be determined as described in the example section.

The shape of the sintered dental zirconia article is not particularly limited.

The sintered dental zirconia article has typically the shape of a dental bridge, veneer, facing, coping, crown, abutment, monolithic dental restoration or parts thereof.

The invention also relates to the use of the porous dental zirconia article described the present text for producing a sintered dental zirconia restoration in process comprising a step of heat-treating the dental zirconia article with a heating rate of at least 3K/sec as described in the present text.

Further embodiments of the invention are outlined below:

Embodiment 1

A process of sintering a dental zirconia restoration,
the process comprising a firing step with a first segment of heat-treating a porous dental zirconia article
with a heating rate of at least 3 K/sec
until a temperature level of 75 to 90% of the final sintering temperature expressed
in ° C. is achieved to obtain a partially sintered dental zirconia article, the firing step comprising a second segment of heat-treating the partially sintered dental zirconia article
with a heating rate being lower than the heating rate of the first segment,
the second segment being applied until a temperature of at least 1,500° C. is reached the firing step comprising a third segment of heat-treating following the second heat-treating segment characterized by
a dwell time of utmost 8 min,
the process comprising a cooling-down segment following the third segment of heat-treating, the cooling-down segment being characterized by the following features alone or in combination
cooling-down rate: 3 K/sec or more;
duration: 6 min or less,
the porous dental zirconia article
having a BET surface of 5 to 12 m$^2$/g and
being composed of a zirconia material containing about 4 mol % yttria and having an alumina content of utmost 0.15 wt. %.

Embodiment 2

A process of sintering a dental zirconia restoration,
the process comprising a firing step with a first segment of heat-treating a porous dental zirconia article
with a heating rate of at least 4 K/sec
until a temperature level of 75 to 90% of the final sintering temperature expressed in ° C. is achieved to obtain a partially sintered dental zirconia article,
the firing step comprising a second segment of heat-treating the partially sintered dental zirconia article
with a heating rate being lower than the heating rate of the first step,
the second step being applied until a temperature of at least 1,500° C. is reached,
the firing step comprising a third segment of heat-treating following the second heat-treating segment characterized by
a dwell time of utmost 5 min,
the process comprising a cooling-down segment following the third segment of heat-treating, the cooling-down segment being characterized by the following features:
cooling-down rate: 3 K/sec or more, and
duration: 6 min or less,
the porous dental zirconia article being characterized by the following features:
having a BET surface of 5.5 to 11 m$^2$/g,
density of 2.5 to 3.5 g/cm$^3$,
average grain size of 50 to 200 nm,
being composed of a zirconia material containing about 4 mol % yttria and having an alumina content of utmost 0.15 wt. %.

Embodiment 3

A process of sintering a dental zirconia restoration,
the process comprising a firing step with a first segment of heat-treating a porous dental zirconia article
with a heating rate of at least 5 K/sec
until a temperature level of 75 to 90% of the final sintering temperature expressed
in ° C. is achieved to obtain a partially sintered dental zirconia article, the firing step comprising a second segment of heat-treating the partially sintered dental zirconia article
with a heating rate being lower than the heating rate of the first step,
the second segment being applied until a temperature of at least 1,500° C. is reached, the firing step comprising a third segment of heat-treating following the second heat-treating segment characterized by
a dwell time of utmost 3 min,
the firing step comprising a cooling-down segment following the third segment of heat-treating, the cooling-down segment being characterized by the following features:
cooling-down rate: 3 K/sec or more, and
duration: 6 min or less,
wherein the above-mentioned process segments are conducted within 25 min or less, the porous dental zirconia article being characterized by the following features:
BET surface within a range of 5 to 12 m$^2$/g,
density of 2.8 to 3.5 g/cm$^3$,
being composed of a zirconia material containing about 4 mol % yttria and having an alumina content of utmost 0.15 wt. % and optionally containing coloring oxides selected from Fe, Mn, Er, Co and mixtures thereof.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate the invention.

Examples

Unless otherwise indicated, all parts and percentages are on a weight basis, all water is de-ionized water, and all molecular weights are weight average molecular weight. Moreover, unless otherwise indicated all experiments were conducted at ambient conditions (23° C.; 1013 mbar).

Methods

Ion Concentration

If desired, the concentration of ions can be determined by X-ray fluorescence spectrometry (XRF). Some XRF devices offer the possibility to directly measure ion concentrations in liquid solutions, e.g. the ZSX Primus II from Rigaku, Japan.

Fluorescence

If desired, the samples are placed in an UV-light box used for inspection of e.g. thin layer chromatography plates. Fluorescence can be detected by the human eye as by the lightening up of the sample against the black background.

BET Surface

The BET surface of a porous article is typically determined as follows: Total pore volume and average pore diameter can be analyzed with the use of $N_2$ sorption isotherms and BET surface area analysis. Samples of around 0.1-2 grams were cut if necessary from larger samples in order to be inserted in to the straight tubes. All samples are degassed in vacuum for more than 1 h at 120° C. before analysis. The samples are then analyzed by adsorption and desorption of $N_2$ gas with a Belsorb II (distributed by Robotherm Prazisionsmesstechnik, Bochum, Germany) in a 9 mm cell with 2 cm bulb and with a 5 mm glass rod. At temperature of liquid nitrogen, absorption data points are collected from 0.1 to 0.99 p/p0 and desorption points collected from 0.99 to 0.5 p/p0. The specific surface area S is calculated by the BET method at p/p0 0.25-0.3 (Details see Chapter 12 regarding calculation see Belsorb Analysis Software User Manual Operating Manual, Chapter 12, Bel Japan. INC).

Method for Measuring Translucency (TL)

If desired, the translucency of the ceramic articles can be evaluated with the following procedure: A test piece in the shape of a disc with an approximate thickness of 1±0.05 mm and an area of measurement of at least 12 mm in diameter is provided. For preparation of the test pieces the pre-sintered sample is sawn into wafers with a thickness of approximately 1.3 mm using a dry cut saw. The parallel large faces of the wafer are ground using silicon carbide sand paper (P2500). The ground samples are sintered in an appropriate furnace to a sintered sample with a thickness of 1±0.05 mm. The sintered sample is measured as fired with a spectrophotometer (X-Rite Color i7, Grand Rapids, USA) in reflectance mode against a white and a black background to obtain the opacity of the material. Translucency is calculated according to T=1-opacity. Higher values of translucency are indicative of greater transmission of light, and less opacity.

If desired, L*a*b* values can be determined in addition to opacity using the same equipment.

Particle Size (Suitable for Micro-Sized Particles)

If desired, the particle size distribution including the mean particle size can be determined with a Cilas 1064 (FA. Quantacrome) particle size detection device.

Density

If desired, the density of the sintered material can be measured by an Archimedes technique. The measurement is made on a precision balance (identified as "BP221S" from Sartorius AG, Gottingen, Germany) using a density determination kit (identified as "YDK01" from Sartorius AG). In this procedure, the sample is first weighed in air (A), then immersed in water (B). The water is a 0.05 wt. % tenside solution (e.g. "Berol 266, Fa. Hoesch). The density is calculated using the formula $\rho=(A/(A-B))\rho 0$, where $\rho 0$ is the density of water. The relative density can be calculated by reference to the theoretical density ($\rho t$) of the material, $\rho_{rel}=(\rho/\rho t)100$.

Porosity

If desired, the porosity can be determined as follows: Porosity=(1-(density of porous material/density of sintered material))×100. The density of the porous material can be calculated by the division of weight and volume. Volume can be obtained by geometrical measurements.

Average Grain Size

If desired, the average grain size can be determined with the Line Intercept Analysis. FESEM micrographs with 70,000 times magnification are used for grain size measurement. Three or four micrographs taken from different areas of the sintered body are used for each sample. Ten horizontal lines, which are spaced at roughly equal intervals across the height of each micrograph, are drawn. The numbers of grain boundary intercepts observed on each line are counted and used to calculate the average distance between intercepts. The average distance for each line is multiplied by 1.56 to determine the grain size and this value is averaged over all the lines for all micrographs of each sample.

Biaxial Flexural Strength

If desired, the biaxial flexural strength of pre-sintered material can be determined according to ISO 6872:2015 with the following modifications: The pre-sintered sample is sawn into wafers with a thickness of 2+/−0.1 mm using a dry cut saw. The diameter of the samples should be 17+/−2 mm. The parallel large faces of the wafer are ground using silicon carbide sand paper (P2500). Each wafer is centred on a support of three steel balls (diameter of the balls 6 mm) with a support diameter of 14 mm. The punch diameter in contact with the wafer is 3.6 mm. The punch is pushed onto the wafer at a rate of 0.1 mm per min. A minimum of 15 samples is measured to determine the average strength. The tests can be conducted in an Instron 5566 universal testing machine (Instron Deutschland GmbH).

Vickers Hardness

If desired, the Vickers hardness can be determined according to ISO 843-4 with the following modifications: The surface of the pre-sintered samples is ground using silicon carbide sand paper (P2500). The surface of the sintered samples is polished with 20 μm diamond suspension. The test forces are adjusted to the hardness level of samples. Used test forces are between 0.2 kg and 2 kg and are applied for 15 s each indentation. A minimum of 10 indentations is measured to determine the average Vickers hardness. The tests can be conducted with a hardness tester Leco M-400-G (Leco Instrumente GmbH).

Materials

The following materials were used:

|  | Description | ZrO$_2$ [wt. %] | Y$_2$O$_3$ [wt. %] | Al$_2$O$_3$ [wt. %] | BET(*) [m$^2$/g] |
|---|---|---|---|---|---|
| 3Y-TZP | Porous zirconia article | 92.31 | 5.62 | 0.12 | 5.1 |
| 5Y-TZP | Porous zirconia article | 88.39 | 9.48 | 0.12 | 5.4 |
| 4Y-TZP (I) | Porous zirconia article | 90.71 | 7.24 | 0.06 | 6.4 |

(*)determined on the porous zirconia article

General Process of Producing the Porous Dental Zirconia Article

Mill blank samples were produced by using the above described porous dental zirconia materials:

The following steps were applied: filling the powder composition in a mould (diameter: 24.9 mm); applying pressure (200 MPa) to the powder filling; demoulding the compacted body; applying a heat treatment in the range of 960° C. to 980° C. for about 2 hours.

Samples were cut from the heat-treated mill blank samples according to the sample dimensions required for measurements.

Special Process of Producing the Porous Dental Zirconia Article—Adjustment of BET To produce porous dental zirconia with BET surface area below 5 m$^2$/g, the following steps were applied to the 4Y-TZP powder: coarsen the powder by heat treatment; filling the powder composition in a mould (diameter: 24.9 mm); applying pressure (200 MPa) to the powder filling; demoulding the compacted body; applying a heat treatment of 970° C. for about 2 hours. A BET of 4.8 m$^2$/g was determined for this porous dental article (4Y-TZP—coarsed).

To produce porous dental zirconia with BET surface area above 12 m$^2$/g, the following steps were applied to the 4Y-TZP powder: ball mill the powder; filling the powder composition in a mould (diameter: 24.9 mm); applying pressure (200 MPa) to the powder filling; demoulding the compacted body; applying a heat treatment of 940° C. for about 30 min. A BET surface of 12.8 m$^2$/g was determined for this porous dental article (4Y-TZP—milled).

General Process of Sintering the Porous Dental Zirconia Article

Sinter Protocol Short (SP-S) and Medium Term (SP-M):
a) a first heat-treating segment up to a temperature of about 1,350° C., which is reached within about 4 min (heating rate 5.3 K/s),
b) a second heat-treating segment up to a temperature of about 1,580° C., which is reached
within about 9.5 min for sinter protocol medium term (heating rate 0.4 K/s) and
within about 2 min for sinter protocol short term (heating rate 2.5 K/s),
c) a third heat-treating segment (dwell time) for about 2 min and
d) a cooling-down segment to 1,000° C., which is reached within about 3 min.

Sinter Protocol Long Term (SP-L):
a) a first heat-treating segment up to a temperature of about 1,350° C., which is reached within about 5.5 min (heating-rate until 400° C. 3.1K/s, then 5.0 K/s),
b) a second heat-treating segment up to a temperature of about 1,580° C., which is reached within about 19 min (heating rate 0.2 K/s),
c) a third heat-treating segment (dwell time) for about 2 min and
d) a cooling-down segment to 1,000° C., which is reached within about 3 min.

The firing step was conducted using a SpeedFire™ furnace from Dentsply Sirona.

After cooling, the samples were investigated with respect to translucency, and speed-sintering performance.

|  | TL for SP-S | TL for SP-M | TL for SP-L |
|---|---|---|---|
| 3Y-TZP | 17 | 27 | 28 |
| 5Y-TZP | 9 | 30 | 35 |
| 4Y-TZP (I) | 27 | 33 | 33 |
| 4Y-TZP - milled, high BET | 25 | 25 | 32 |
| 4Y-TZP - coarsed, low BET | 0 | 0 | 1 |

Evaluation:

In comparison to the 3Y-TZP or 5Y-TZP materials, the 4Y-TZP material showed a high translucency already after a short sintering time (e.g. sintering protocol SP-S; SP-M).

If the BET surface of the porous zirconia article is too low, the translucency is very low. If the BET surface of the porous zirconia article is too high, the translucency is lowered.

What is claimed is:

1. A process of sintering a porous dental zirconia article, the process comprising:
   providing the porous dental zirconia article,
      the porous dental zirconia article having been subjected to a pre-sintering heat treatment at a temperature of 960° C. to 980° C.,
      the porous dental zirconia article characterized by a BET surface of 5 to 12 m$^2$/g and being composed of a zirconia material containing about 4 mol % yttria and no greater than 0.15 wt. % alumina;
   subjecting the porous dental zirconia article to:
      a first segment of heat-treating, the first segment of heat-treating involving a heating rate of at least 3 K/sec until a temperature of 1,125° C. to 1,485° C. is achieved, and
      a second segment of heat-treating, the second segment of heat-treating involving a heating rate of 2.5 K/sec until a final sintering temperature of 1,500° C. to 1650° C. is reached, to obtain a partially sintered dental zirconia article.

2. The process according to claim 1, further comprising a third segment of heat-treating, the third segment of heat-treating following the second heat-treating segment of heat-treating without interruption,
   the third segment of heat-treating characterized by a dwell time at the final sintering temperature of utmost 8 min.

3. The process according to claim 2, further comprising a cooling-down segment, the cooling-down segment following the third segment of heat-treating without interruption,
   the cooling-down segment being characterized by the following features alone or in combination:

cooling-down rate: 3K/sec or more until a temperature of 1,000° C. is reached;
duration: 6 min or less.

4. The process according to claim 3, the first segment of heat-treating, the second segment of heat-treating, the third segment of heating-treating, and the cooling-down segment having a total duration of 30 min or less.

5. The process according to claim 1, the process further comprising:
providing a porous dental zirconia mill blank,
machining the porous dental zirconia article from the porous zirconia dental mill blank.

6. The process according to claim 1, characterized by one or more of:
the first segment of heat-treating: heating rate of 3 to 7 K/sec and a duration of 8 min or less;
the second segment of heat-treating: heating rate of 2.5 K/sec and a duration of 25 min or less;
a third segment of heat-treating: heating rate of 0 K/sec and a duration of 8 min or less;
a cooling-down segment: cooling rate of 3 K/sec or more and a duration of 6 min or less.

7. The process according to claim 1, the porous dental zirconia article being characterized by one or more of:
density: 2.85 to 3.35 g/cm$^3$;
BET surface: 5.5 to 11 m$^2$/g;
coefficient of thermal expansion: $8.5*10^{-6}K^{-1}$ to $11.5*10^{-6}K^{-1}$.

8. The process according to claim 1, the porous dental zirconia article being characterized by the following features alone or in combination:
raw breaking resistance: 15 to 55 MPa, determined according to ISO 6872:2015 applying the punch on 3 balls test adapted to measurement in porous state;
Vickers hardness: 25 (HV 0.5) to 150 (HV 0.5).

9. The process according to claim 1, the porous dental zirconia article being characterized by the following features:
$ZrO_2+HfO_2$: 80 to 95 wt. %,
$Al_2O_3$: 0 to 0.15 wt. %,
colouring oxides: 0.01 to 1 wt. %,
wt. % with respect to a weight of the porous dental zirconia article.

10. The process according to claim 1, the porous dental zirconia article comprising coloring oxides selected from oxides of Fe, Mn, Cr, Ni, Co, Er, Pr, Nd, or any combination thereof.

11. The process according to claim 1, the porous dental zirconia article excluding one or more of: glass; glass ceramic; oxides of Si, Fe, K, Na; in an amount above 1 wt. % with respect to a weight of the porous zirconia dental article.

12. The process according to claim 1, for preparing a sintered dental zirconia restoration characterized by one or more of:
translucency: 25% or more, determined on a sample having a thickness of 1 mm in reflection mode at a wave length of 450 to 800 nm;
density: at least 98.5% of theoretical density;
phase content tetragonal phase: 10 to 80 wt. %;
phase content cubic phase: 10 to 80 wt. %;
biaxial flexural strength: 500 to 1,500 MPa, determined according to ISO 6872:2015.

13. The process according to claim 1, for preparing a sintered dental zirconia restoration having a shape of a dental bridge, a veneer, a facing, a coping, crown, an abutment, an inlay, an onlay, an implant, a monolithic dental restoration, or parts thereof.

* * * * *